C. KIRCHHOF.
CANDLE-HOLDER.
No. 6,805. Reissued Dec. 14, 1875.
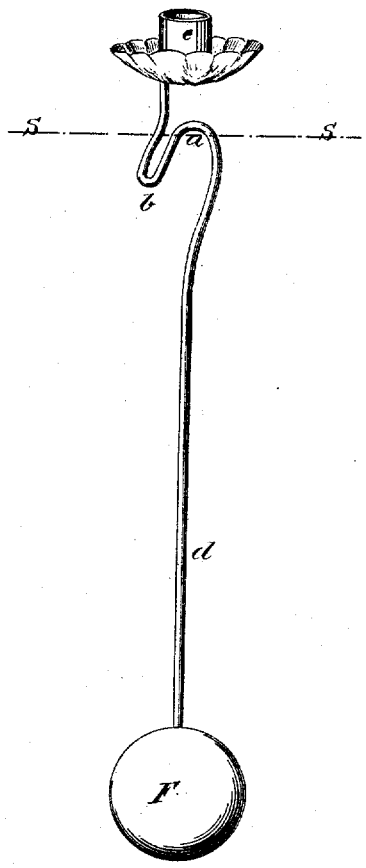
WITNESSES:
A. W. Almqvist
Gustave Dieterich
INVENTOR:
C. Kirchhof
BY Munn & Co.
ATTORNEYS.
N. PETERS, PHOTO-LITHOGRAPHER, WASHINGTON, D. C.

UNITED STATES PATENT OFFICE.

CHARLES KIRCHHOF, OF NEWARK, NEW JERSEY.

IMPROVEMENT IN CANDLE-HOLDERS.

Specification forming part of Letters Patent No. 72,506, dated December 24, 1867; reissue No. 6,805, dated December 14, 1875; application filed November 19, 1875.

*To all whom it may concern:*

Be it known that I, CHARLES KIRCHHOF, of Newark, in the county of Essex and State of New Jersey, have invented a new and Improved Candle-Holder, of which the following is a specification:

The nature of my invention consists in the construction of an arrangement for conveniently attaching candles, ornaments, or other objects to, and maintaining them above, any oscillating support (as the branches of a tree) in their proper position.

I will now proceed to describe my construction and operation.

The construction of my device is based upon the principle of a counterbalanced pendulum.

A hook, *a b*, as shown in the drawing, and made of the required material, may be so arranged as to be conveniently attached either by the curved part *a* or the point *b* to the support *s s*, and easily removed again. To this hook is attached the candle-holder *e* or any other object desired, either by means of the short part *c* extending upward, as shown in the drawing, or in any other suitable manner. The hook *a b* is also provided with the rod *d*, to the lower end of which may be attached in any suitable manner the weight *f*, which may consist of a ball, fruit, or any other object of sufficient gravity for successful operation.

It is obvious that my improvement may consist of one or more pieces of a variety of materials, if arranged in substantially the manner above described.

Having described my invention I will now state what I desire to secure by Letters Patent.

I claim—

As an improved article of manufacture, the candle-holder *e*, in combination with the hook *a b* and rod *d*, arranged to connect with a suitable weight, *f*, in the manner and for the purposes substantially as described.

CHARLES KIRCHHOF.

Witnesses:

AUGUST HUNGER,
WILLIAM MANGER.